(12) United States Patent
Marik et al.

(10) Patent No.: US 6,262,369 B1
(45) Date of Patent: Jul. 17, 2001

(54) CONDUIT CONNECTOR PROVIDING DUAL DIAMETER END STOPS

(75) Inventors: Gregory C. Marik, Germantown; J. Lawrence Cole, Memphis, both of TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/400,751

(22) Filed: Sep. 22, 1999

Related U.S. Application Data
(60) Provisional application No. 60/102,284, filed on Sep. 29, 1998.

(51) Int. Cl.[7] .................................................. H02B 1/30
(52) U.S. Cl. ........................... 174/64; 174/77 R; 174/151; 248/56
(58) Field of Search .................................. 174/64, 77 R, 174/93, 65 R, 65 G, 152 G, 151, 153 G; 248/56; 285/195, 194; 220/4.09; 439/472

(56) References Cited

U.S. PATENT DOCUMENTS

| | | | |
|---|---|---|---|
| 1,788,054 | * 1/1931 | Godfrey | 174/64 |
| 1,826,708 | * 10/1931 | Colitz | 174/64 |
| 2,311,427 | * 2/1943 | Winkelmeyer | 16/108 |
| 3,993,330 | * 11/1976 | Goransson | 174/64 |
| 4,262,166 | * 4/1981 | Radzishevsky et al. | 174/65 R |
| 5,539,152 | * 7/1996 | Gretz | 248/56 X |
| 5,647,613 | * 7/1997 | Marik et al. | 285/195 |
| 5,700,977 | * 12/1997 | Ford et al. | 174/64 |
| 5,831,213 | * 11/1998 | Wright et al. | 174/64 |
| 5,894,109 | * 4/1999 | Marik | 174/65 R |
| 5,905,230 | * 5/1999 | Marik | 174/65 R |

FOREIGN PATENT DOCUMENTS

| | | |
|---|---|---|
| 621632 | 12/1962 | (BE) . |
| 1307295 | 9/1962 | (FR) . |

* cited by examiner

Primary Examiner—Dean A. Reichard
Assistant Examiner—Dhiru R Patel
(74) Attorney, Agent, or Firm—Hoffman & Baron, LLP

(57) ABSTRACT

A conduit connector providing two end stop diameters. The connector includes a removable annular insulator located at the conductor egressing end of the connector. The removable annular insulator provides the smaller of the two end stop diameters when positioned therein. When the removable annular insulator is removed, the greater of the two end stop diameters is provided at the conductor egressing end of the connector.

7 Claims, 2 Drawing Sheets

US 6,262,369 B1

CONDUIT CONNECTOR PROVIDING DUAL DIAMETER END STOPS

This application claims the benefit of U.S. Provisional Application Ser. No. 60/102,284 filed Sep. 29, 1998.

BACKGROUND OF THE INVENTION

The present invention relates to connectors used to retentively terminate conduits to an electrical junction box and, more particularly, to connectors providing dual diameter end stops.

In both commercial and residential construction, electrical conductors which run between various locations are typically housed in an outer protective jacket. Such structures are referred to as electrical conduits. One such conduit is a flexible, metallic conduit where the conduit includes an outer helically convoluted metal jacket for enhanced flexibility. The conduit is terminated to an electrical junction or outlet box and the individual conductors are terminated to an electrical device supported in the junction box.

In order to suitably retain the conduit in the junction box, a conduit connector or fitting is employed to terminate the conduit and to mechanically and electrically secure the conduit to the junction box itself. Conduit connectors of this type are well-known in the electrical connection art. These connectors typically include a cylindrical body which supports therein an end extent of the conduit. The cylindrical body is attachable to the junction box through a knockout opening to allow passage of the conductors into the junction box. A screw may be interposed through the wall of the connector body to engage the conduit thereby securely retaining the conduit within such connector body.

As mentioned, the connector is mechanically secured to the junction box. One end of the connector is positioned such that it extends through the knockout opening in the junction box and terminates within the junction box. In one application, the end extending into the junction box is threaded for receipt of a securing nut which is installed from the inside of the junction box, thus mechanically securing the connector to the box. In another application, examples of which are disclosed in U.S. Pat. Nos. 3,147,776 and 3,556,566, the cylindrical body of the connector is formed in a split-shell arrangement, whereupon tightening of the screw against the conduit causes the respective shells of the connector body to expand outwards thereby engaging the walls of the junction box about the opening.

As will be appreciated by those skilled in the art, the end extent of conduit is fully inserted within the connector prior to securing the conduit to the connector via a screw or saddle. The electrical conductors carried within the conduit thereby pass through the knockout opening end into the junction box for access by the installer. However, to prevent the conduit itself from being advanced beyond the conductor regressing end of the connector (and thereby through the knockout opening into the junction box), connectors are provided with what is commonly referred as an "end stop." The end stop reduces the diameter of the aperture extending through the conductor egressing end of the connector to a diameter less than the outer diameter of the conduit extending within the connector. In this fashion, the end extent of conduit may be inserted into the connector from the conduit receiving end, but is prevented from being advanced through the aperture of the conductor egressing end of such connector.

As will be further appreciated by those skilled in the art, the requirement to provide an end stop at the conductor egressing end of the connector has in the past required the production and marketing of distinct connectors for distinctly sized conduits. This requirement requires a manufacturer to produce various connector models, and requires the installer to purchase and have accessible such models.

Thus, there is a need in the art for a single conduit connector which is capable of providing more than a single end stop diameter, and which may therefore be used with more than a single type of conduit.

SUMMARY OF THE INVENTION

The present invention, which addresses the needs of the prior art, relates to a connection device for terminating electrical conduit having at least one electrical conductor therein to a knockout opening in an electrical junction box. The connection device includes an elongate connector housing having a conduit receiving end, an opposed conductor egressing end and a conduit-supporting passage extending therebetween. The conduit-supporting passage defines an axial direction. The conductor egressing end includes an aperture therethrough to allow the conductor to extend through the housing and into the junction box. The connection device also includes conduit engaging means carried by the housing for retentively engaging the electrical conduit within the conduit-supporting passage. The connection device further includes a first annular insulator positioned in the aperture to both insulate the conductor extending therethrough from the aperture and provide a first conduit end stop defining the first diameter. Finally, the connection device includes a second annular insulator removeably positioned within the first diameter of the first annular insulator to provide a second conduit end stop defining a second diameter, the second diameter being less than the first diameter.

As a result, the present invention provides a single conduit connector which is capable of providing more than a single end stop diameter, and which may therefore be used with more than a single type of conduit. This thus eliminates the need for a manufacturer to produce various connector models, and simultaneously eliminates the need for an installer to purchase and have accessible such various connector models.

DETAILED DESCRIPTION OF THE INVENTION

Figure 1:
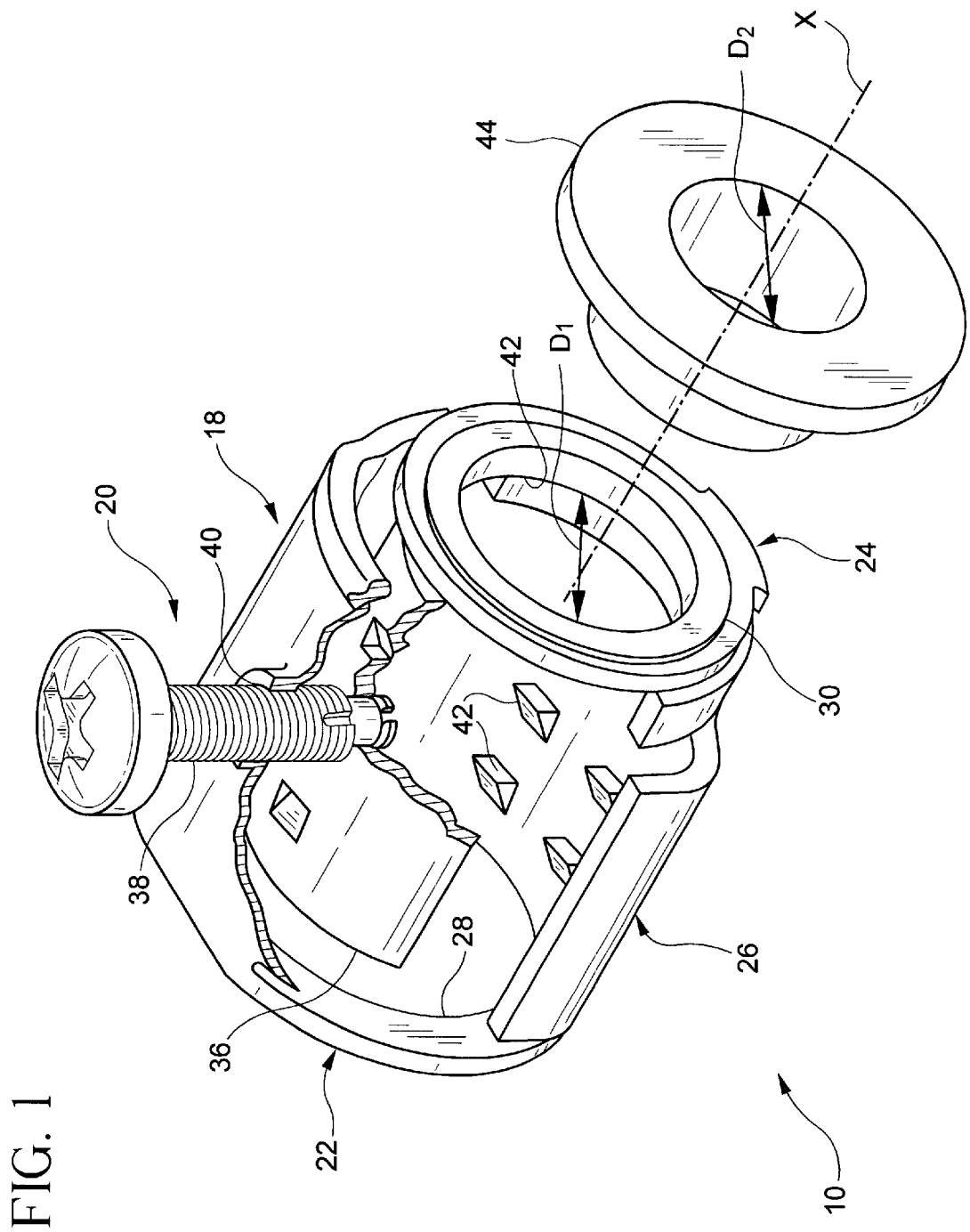
FIG. 1 is a perspective view in partial section of the connector of the present invention showing the removable insert exploded away from the connector.
Figure 2:
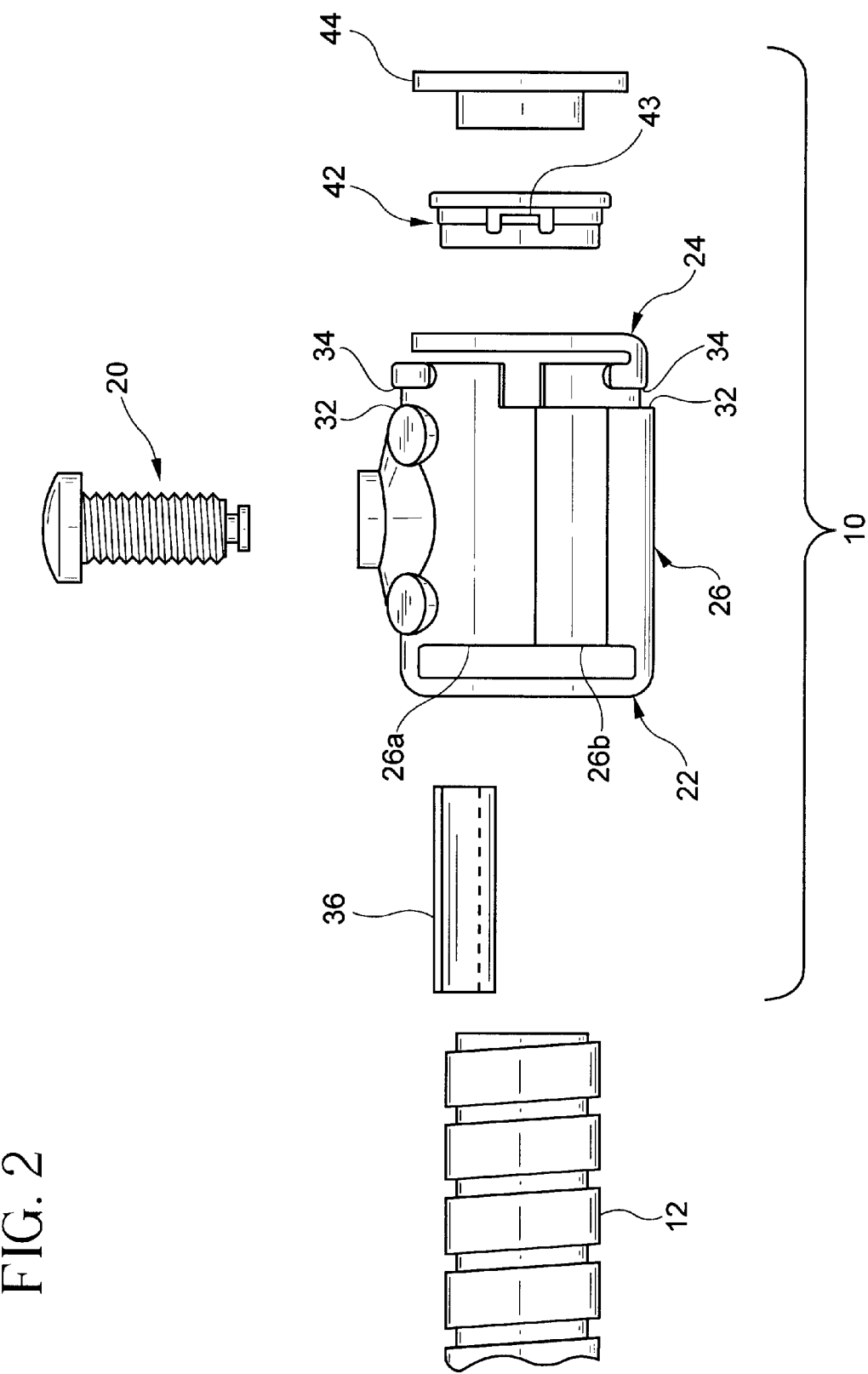
FIG. 2 is an exploded elevational view of the connector of FIG. 1.

A conduit connector 10 for terminating an electrical conduit 12 is shown in FIGS. 1–2. More particularly, connector 10 is secured to a knockout opening (not shown) formed in an outlet box (not shown). The knockout opening is preferably a circular opening.

Connector 10 includes an elongate cylindrical-shaped housing 18 formed from a single metal stamping and a conduit engaging screw 20. Housing 18 includes a conduit receiving end 22 and an opposed conductor egressing end 24. Housing 18 further includes a conduit-supporting passage 26 extending between conduit receiving end 22 and conductor egressing end 24. This conduit-supporting passage 26 defines an axial direction X.

Conduit 12 shown in FIG. 2 is used to surround and thereby protect an electrical conductor (not shown) extending therethrough. The electrical conductor, itself, is typically contained within an electrically-insulating jacket. Of course, more than one electrical conductor can extend through the conduit.

Conduit receiving end 22 includes a generally circular opening 28 which is sized to allow electrical conduit 12 to pass therethrough. Conductor egressing end 24 includes a generally circular opening 30 through which the conductors carried within electrical conduit 12 may extend through and thus into junction box 14.

Connector housing 18 is formed from a flat metal blank. More particularly, a metal sheet is stamped and thereafter formed into the configuration shown in FIGS. 1–2. As will be apparent to those skilled in the art, the manufacture of conduit connectors from a single metal stamping process is a commercially practical manner of forming such device.

Conduit-supporting passage 26 of connector 10 includes upper and lower relatively movable connector halves 26a and 26b, respectively, which are movable in a clam shell fashion about the conduit receiving end 22. Stated differently, the conduit receiving end forms a pivot about which the connector halves may rotate. In conventional fashion, the connector may be secured to the knockout opening of the junction box by squeezing the upper and lower halves 26a and 26b together to radially compress the connector housing at the conductor egressing end. Once the conductor egressing end is inserted through the knockout opening, the resiliency of the housing causes the upper and lower halves to expand radially outward to secure the connector to the junction box.

Connection housing 18 is preferably formed with opposing lips 32, 34 which are spaced a sufficient distance from one another as to capture the wall of the junction box therebetween. The diameter of the housing defined by the lips is approximately equal to the diameter of the knockout opening when the housing is in a relaxed state.

To install the connector to the junction box, the conductor egressing end is radially compressed until the diameter defined by the lips is reduced to the diameter of the knockout opening, thus allowing the conductor egressing end to pass through the knockout opening. The conductor egressing end is then released whereby the resiliency of the housing causes the connector halves to expand radially outward thereby loosely retaining the wall of the junction box between lips 32 and 34.

In conventional fashion, an end extent of conduit 12 is inserted into the connector through conduit receiving end 22. The conductors carried by the conduit are then extended through conductor egressing end 24 and into the junction box.

As discussed more fully in commonly-owned U.S. Pat. No. 5,647,613, the disclosure of which is hereby incorporated herein by reference, screw 20 supports a saddle 36 which upon advancement of shaft extent 38 through body aperture 40 causes saddle 36 to move into engaging contact with conduit 12. It is contemplated that certain applications could simply utilize a screw to engage conduit 12, or other such mechanical engaging members In order to securely retain the connector within the knockout opening, screw 20 is tightened until saddle 36 firmly engages the outer diameter of the end extent of conduit supported therein. Continued tightening of screw 20 forces conduit 12 against the lower interior surface of the connector housing. Further additional tightening of screw 20 forces the upper and lower body halves 26a and 26b apart thereby expanding housing 18 to a point where lips 32, 34 are urged into engagement with the periphery of the knockout opening of the junction box. Thus, the tightening of screw 20 both secures the conduit 12 within the housing 18 of connector 10 and secures the connector within the knockout opening of the junction box 14. Of course, connector 10 could alternatively include a threaded conductor egressing end which receives a securing nut installed from inside the junction box, thus mechanically securing the connector to the box.

In order to provide for increased resistance against axial pullout of conduit 12 from connector 10, the connector may include one or more inwardly directed lances extending from a lower interior surface of the housing. The lances, as explained more filly in U.S. Pat. No. 5,647,613 incorporated herein by reference, are positioned in transverse and longitudinal spaced apart relationship and extend for engagement with the outer surface of conduit 12.

As will be appreciated by those skilled in the art, U.L. Certification requires end stop diameters having specified diameters (within prescribed tolerances) for different types of cable and conduit, including Flexible Metal Conduit (FMC), Armored Cable (AC), and Metal-Clad Cable (MC). For example, according to UL 514B Table 17.1, the internal diameter of the end stop of FMC on ⅜" trade size must be between 0.319 and 0.375 inches. For the same size of MC, UL 514B Table 18.1 requires that the internal diameter of the end stop diameter be between 0.200 and 0.622 inches.

As will be appreciated by those skilled in the art, connectors such as connector 10 include what is commonly referred to as an end stop to prevent the conduit extending through passage 26 from passing through and extending beyond conductor egressing end 24. It has been discovered herein that a single connector can be formed having dual end stop diameters such that the connector may be used with more than one type of conduit. In this regard, connector 10 is provided with a first insulator, i.e., insulative throat 42, which both prevents abrasive engagement of the conductors with the metallic edge defining circular opening 30 and provides a first end stop diameter. This first end stop diameter is defined by the inner diameter of insulative throat 42 which ranges from about 0.200 to above 0.622 inches as described below. In this regard, inner diameter $D_1$ of insulative throat 42 defines the greater of the two end stop diameters provided in the present invention.

As best seen in FIG. 2, insulative throat 42 is preferably provided with a lip 43 which allows the insulative throat to be snap-fit within opening 30. Insulative throat 42 is thus securely fixed to conductor egressing end 24 of connector 10. In one preferred embodiment, insulative throat 42 is sized with an inside diameter meeting the requirements of metal clad cable. As mentioned, U.L. requirements for certain sized metal clad cables specify that the internal diameter of the end stop be between 0.200 and 0.622 inches. As will be appreciated by those skilled in the art, it is advantageous to maximize the throat size through the conductor egressing end of connector whereby a connector intended for use with metal clad cable would preferably provide an end stop having an internal diameter closer to the 0.622" dimension than to the 0.200" dimension.

The present invention further includes a second insulator 44 which is press-fit within insulative throat 42, but is removable therefrom by, for example, the use of a screwdriver. When installed, second insulator 44 further reduces the diameter of the opening extending through conductor egressing end 24. In this regard, second insulator 44 provides an internal diameter $D_2$ ($D_2$ being smaller than $D_1$). The internal diameter of insulator 44 may be sized according to the U.L. specifications for flexible metal conduit. In one preferred embodiment, insulator 44 is sized with an inner diameter from about 0.319" to about 0.375", and preferably having a diameter closer to the 0.375" dimension than the 0.319" dimension to provide the maximum throat size.

Thus, the present invention provides a connector which may, for example, include a first snap-in insulator having an inside diameter meeting the requirements of MC and further including a second insulator having an inside diameter meeting the requirements of FMC. The second insulator is assembled into the connector by the manufacturer, but is removable by the end user when necessary. However, the second insulator is assembled to connector 10 in such a manner as to not dislodge from the connector during usage in the field, i.e., it must be specifically removed by the end user. Preferably, the second insulator will exceed the dislodgement test set forth in UL-514B.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. A connection device for terminating electrical conduit having at least one electrical conductor therein with a knockout opening in an electrical junction box, said device comprising:

an elongate connector housing having a conduit receiving end, an opposed conductor egressing end and a conduit-supporting passage extending therebetween, said conduit-supporting passage defining an axial direction, said conductor egressing end including an aperture therethrough to allow said conductor to extend through said housing and into said junction box;

conduit engaging means carried by said housing for retentively engaging said electrical conduit within said conduit-supporting passage;

a first annular insulator positioned in said aperture to both insulate said conductor extending therethrough from said aperture and provide a first conduit end stop defining a first diameter; and a second annular insulator removably positioned within said first diameter of said first annular insulator to provide a second conduit end stop defining a second diameter, and wherein said second diameter is less than said first diameter.

2. The device according to claim 1, wherein said first insulator includes a lip which allows said first insulator to be snap-fit within said aperture.

3. The device according to claim 1, wherein said second insulator is press-fit within said first diameter of said first insulator.

4. The device according to claim 1, wherein said first diameter ranges from about 0.200 to about 0.622 inches and said second diameter ranges from about 0.319 to about 0.375 inches.

5. The device according to claim 1, wherein said insulators are formed from a non-abrasive plastic.

6. The device according to claim 1, wherein said housing includes upper and lower connector halves relatively moveable with respect to one another in clam-shell fashion about said conduit receiving end between a first position which allows said conductor egressing end to be inserted into said knockout opening and a second position which fixedly secures said conductor egressing end in said knockout opening of said electrical junction box.

7. The device according to claim 1, which said housing is formed from a single metal stamping.

* * * * *